Jan. 19, 1954 E. W. STEWART 2,666,723
METHOD OF MANUFACTURING HELICAL COIL COMPRESSION SPRINGS
Filed Dec. 19, 1951

DESIGNED FREE LENGTH
OF FINISHED SPRING

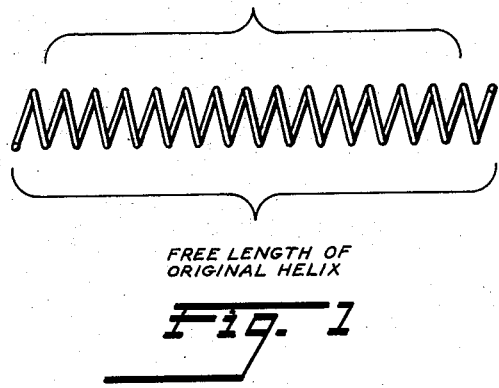

FREE LENGTH OF
ORIGINAL HELIX

Fig. 1

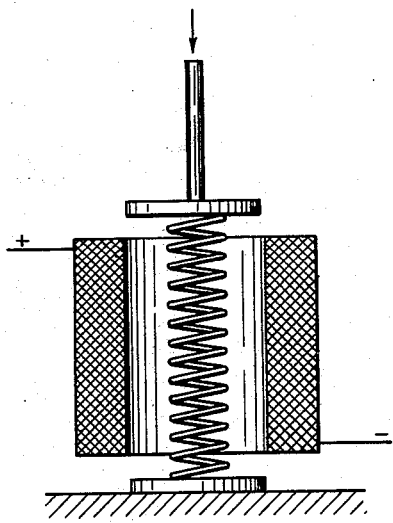

COMPRESSION BY LOADING WITH FORCE
WHICH IS THE ROOM-TEMPERATURE
EQUIVALENT OF DESIGNED LOAD AT
DESIGNED COMPRESSED LENGTH, AND
THEN HEATING BELOW THE CRITICAL
RANGE OF THE MATERIAL UNTIL
SPRING HAS DESIGNED COMPRESSED
LENGTH.

Fig. 2

INVENTOR
ELLIOTT W. STEWART

BY *Scrivener + Parker*

ATTORNEYS

Patented Jan. 19, 1954

2,666,723

UNITED STATES PATENT OFFICE 2,666,723

METHOD OF MANUFACTURING HELICAL COIL COMPRESSION SPRINGS

Elliott W. Stewart, Chicago, Ill., assignor to Associated Spring Corporation, Bristol, Conn., a corporation of Delaware Application December 19, 1951, Serial No. 262,441

1 Claim. (Cl. 148—12)

This application is a continuation-in-part of my co-pending application Serial No. 705,422, now abandoned.

This invention relates, in general, to the manufacture of springs and, more particularly, to the manufacture of helical coil compression springs.

It is desirable in many industrial uses of helical coil compression springs that such springs carry a definite load, i. e. produce a definite force when compressed to a predetermined length. Heretofore this has been accomplished largely by selection of materials, design scale testing and re-working of springs. This method has been satisfactory from the standpoint of efficient manufacture and has also permitted a good degree of accuracy in achieving the desired load at the predetermined compressed length.

This invention provides an improved method of causing compression springs to bear a definite load at a predetermined length which method might be adapted to large scale spring manufacture, which would provide a greater degree of accuracy than has heretofore been achieved, and which would eliminate the scale testing and re-working required by present methods of manufacturing springs of the type to which the invention relates. Another object achieved by the invention has been to provide helical coil compression springs having less tendency to set under heat, when in use, than those manufactured in accordance with known methods.

The two figures of the drawing illustrate successive steps in the method according to my invention.

The method consists in first forming a helical coil which is longer than the designed overall free length of the finished spring which is to be manufactured. This overlength coil will obviously produce a greater force, when compressed to a predetermined length, than a spring formed of the same stock but having the designed overall free length of the finished spring. This overall free length helix is now compressed by loading it at length helix is now compressed by loading it at room temperature with a force which is the room-temperature equivalent of the load which the spring is designed to support at the required compressed length, thus compressing the spring to a length which is greater than such predetermined compressed length. While so compressed the spring is heated to a temperature which is below the critical (or transformation) range of the material of which it is formed but which is sufficient to effect a reduction in the elastic limit. This heating under compression causes the coil to take a permanent set whereby the length of the spring and the force exerted thereby progressively decrease, and such heating under compression is continued until the length of the spring under the force exerted thereon has decreased to the required designed length whereupon the compressing force and heat are removed from the spring, which is then allowed to cool.

In the application of this method to a specific spring, it may be assumed that it is desired to manufacture a helical coil compression spring which in its finished condition, will have a free length of 6 inches and will exert a force of 500 lbs. when compressed to a length of five inches. A typical spring steel, which will be used in this example, may have the composition: C-.80%, MN-.80%, P-.04%, S-.05% and the balance Fe. The lower temperature of the critical or transformation range of this steel is 1325° F. In accordance with my method a coil is first formed in any well-known manner which will have a free length longer than 6 inches and which may be, for example, 6½ inches long. The helix may now be subjected to the usual heat treatment to remove coiling strains, which may be performed at about 750° F., and to end grinding and shot-peening if these are required. This overlength helix is compressed by a force the magnitude of which is pre-determined to be the equivalent of 500 lbs. at room temperature and which, in the example being given, is 450 lbs. When so compressed, the spring will be slightly longer than the test length required because of the fact that it was wound overlength. While so compressed, the spring is heated to a temperature which is below the critical range of its material, but which is sufficient to reduce the elastic limit thereof for the duration of the heating, until its elastic limit is so reduced that the compressed length of the spring has been reduced to 5 inches and it exerts a force equivalent to 500 lbs. at room temperature at which time the compressing force and the heat are both removed. In the case of the steel being used in this example the coil may be heated at 450° F. for three minutes to give the desired results, it being assumed that the spring was shot-peened as heretofore described. If shot-peened, the spring should not be heated to a temperature higher than about 500° F. in this step of the method, while springs which have not been shot-peened may be heated to a temperature which does not exceed 900° F. The term "equivalent to 500 lbs. at room temperature" refers to the fact that, due to a reduction in the modulus of elasticity it takes less than 500 lbs. capacity, under heat, to support 500 lbs. at room temperature.

In the process of cooling, the spring may change slightly in free length causing a variation in the load at the predetermined length. This variation will be very small, however, in comparison to the accuracy permitted by present methods of manufacture and will usually be found not to exceed ±1½% of the designed load. Springs manufactured in accordance with this method need not be scale tested nor re-worked and are nearer to designed load than any springs produced by known methods.

It will be apparent to those skilled in the art that certain modifications of the method disclosed in this application may be made without departing in any way from the spirit or scope of the invention, for the limits of which reference must be had to the appended claim.

What is claimed is:

The method of manufacturing, from spring wire formed of a steel having a critical range and capable of being formed into a spring which will be reduced in length by the application of pressure and at least A degrees of heat, which temperature is below the critical range of the spring wire, a helical coil compression spring having a finished free length of X inches and designed to carry a load of Y pounds when compressed from its free length to a length of Z inches, which comprises the steps of forming an initial helical coil which is longer than X inches, removing coiling strains by heating, compressing the helix by loading it with the equivalent of Y pounds thereby compressing it to a length greater than Z inches at room temperature, then while maintaining such loading heating the helix to a temperature which is below A degrees but which is sufficient to reduce the elastic limit of the material while the heating is continued, and maintaining such heating until the helix is reduced to Z inches in length, and thereupon immediately removing the pressure and heat from the coil.

ELLIOTT W. STEWART.

References Cited in the file of this patent

UNITED STATES PATENTS

| Number | Name | Date |
| --- | --- | --- |
| 2,261,878 | Hathaway | Nov. 4, 1941 |
| 2,332,826 | Fryer et al. | Oct. 26, 1943 |